(12) United States Patent
Barry et al.

(10) Patent No.: US 7,590,973 B1
(45) Date of Patent: Sep. 15, 2009

(54) SYSTEMS AND METHODS FOR GATHERING, ORGANIZING AND EXECUTING TEST CASES

(75) Inventors: Damon Barry, Redmond, WA (US); Greg Veith, Bellevue, WA (US); Brent Jensen, Bothell, WA (US); Frank Truong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 09/607,397

(22) Filed: Jun. 30, 2000

(51) Int. Cl.
*G06F 9/44* (2006.01)
*G06F 11/00* (2006.01)
(52) U.S. Cl. .................. 717/126; 717/131; 714/38; 719/315
(58) Field of Classification Search ............... 714/37, 714/38, 40; 717/120, 124–127, 130, 131, 717/134, 135; 719/315, 316
See application file for complete search history.

(56) References Cited

U.S. PATENT DOCUMENTS

| | | | | |
|---|---|---|---|---|
| 5,581,696 | A * | 12/1996 | Kolawa et al. | 714/38 |
| 5,615,333 | A * | 3/1997 | Juettner et al. | 714/38 |
| 5,629,878 | A * | 5/1997 | Kobrosly | 702/120 |
| 5,671,351 | A * | 9/1997 | Wild et al. | 714/38 |
| 5,835,566 | A * | 11/1998 | Cowgill | 379/15.01 |
| 5,951,697 | A * | 9/1999 | O'Donnell et al. | 714/37 |
| 6,023,773 | A * | 2/2000 | O'Donnell et al. | 714/40 |
| 6,332,211 | B1 * | 12/2001 | Pavela | 717/130 |
| 6,505,342 | B1 * | 1/2003 | Hartmann et al. | 717/125 |
| 6,654,911 | B1 * | 11/2003 | Miles | 714/38 |

OTHER PUBLICATIONS

"Release Notes for TETware Release 3.3," Sep. 18, 1998, The Open Group, TET3-RN-3.3, pp. i, ii, 1-8.*
"TETware Programmers Guide, Revision 1.2," Sep. 18, 1998, The Open Group, TET3-PG-1.2, pp. i-x, 1-10.*
"TETware User Guide, Revision 1.2," Sep. 18, 1998, The Open Group, TET3-UG-1.2, pp. i-vi, 1-116.*
"TETware Programmers Guide, Revision 1.2," Sep. 18, 1998, The Open Group, TET3-PG-1.2, pp. 11-258.*

* cited by examiner

*Primary Examiner*—Eric B Kiss
(74) *Attorney, Agent, or Firm*—Workman Nydegger

(57) ABSTRACT

Systems and methods for gathering, organizing and executing test cases irrespective of the language or format employed. Implementation of the present invention takes place in association with a harness that is interposed between a software package to be tested and a program module. Programming code comprising a connector interfaces the harness with the program module in order for the harness to receive a hierarchy that comprises one or more test cases, test suites and/or test modules. The harness traverses the hierarchy and executes test cases selected by a user on the developed software package. Therefore, in accordance with the present invention, individuals testing the software package can select any desired test case format (programming language, machine architecture, operating system, test sequence, etc.) that satisfies the demands of the developed software package, and the harness will gather, organize, and execute the developed test case(s) irrespective of the language or format employed.

20 Claims, 4 Drawing Sheets

SYSTEMS AND METHODS FOR GATHERING, ORGANIZING AND EXECUTING TEST CASES

BACKGROUND OF THE INVENTION

1. The Field of the Invention

The present invention relates to systems and methods for gathering, organizing and executing test cases irrespective of the language or format employed. More specifically, the present invention relates to systems and methods that organize a hierarchy comprising test cases, test suites and test modules, traverse the hierarchy to run selected test cases on developed software packages to identify erroneous logic, and execute test cases on multiple threads in various scenarios.

2. The Prior State of the Art

Once a computer program has been developed, it is customary to identify and resolve any erroneous logic that was introduced during the stage of writing the program. The erroneous logic is referred to as a "bug" and includes invalid data or instructions that cause a division by zero or misdirect the computer to the wrong place in the program. Bugs cause a program to provide invalid output that may or may not result in the program crashing. Therefore, extensive testing of a newly developed computer program is required to identify any erroneous logic in the program.

One manner of testing a newly developed computer program is by applying a series of related steps, referred to as a "test case," designed to test an aspect or feature of the developed computer program. This manner of testing is referred to as automated or programmatic testing. The test cases are repeatedly executed on the computer program by a set of instructions known as a "harness."

Each time a computer program is tested programmatically, a new or modified harness is written to execute developed test cases on the computer program. Within teams of program testers it is common to use many different harnesses, each having been developed and maintained to service a narrow set of test cases. The developed harnesses are hard-coded to the specific language and format of the developed programs and/or test cases. Furthermore, the harnesses are frequently written in line with the test cases, causing writers of test cases to learn the challenging task of separating the code of the test cases from the code of the harness. Further still, harnesses are often inextricably tied to the user interface they expose so that a user of a harness is only provided one way to control the harness and to view the results.

As such, computer programmers currently spend large amounts of time writing or modifying a harness after a new computer program has been developed so that the newly developed program can be tested. The large amounts of time required to develop each harness have resulted in less time testing the developed program. Moreover, since each harness is customized for a narrow set of test cases, a great proliferation of customized test harnesses hard-coded to the specific language and format of the developed program and/or test case currently exist in the area of software development and testing. As a result, computer program testers have found the large number of test harnesses to be very difficult to manage.

SUMMARY OF THE INVENTION

The present invention relates to systems and methods for gathering, organizing and executing test cases irrespective of the language or format employed. More specifically, the present invention relates to systems and methods that organize a hierarchy comprising test cases, test suites and test modules, traverse the hierarchy to run selected test cases on developed software packages to identify erroneous logic, and execute test cases on multiple threads in various scenarios.

Embodiments of the present invention include interposing a set of instructions, known as a harness, between a software package and a program module to test the software package for erroneous logic. The harness and program module are connected through the use of a connector, which includes one or more interfaces. In one embodiment, a user writes an individual connector for connecting a program module to the harness. In another embodiment, the connector is predefined within the harness. The connector extracts one or more test cases from the program module irrespective of the language or format employed. Each test case is a series of related steps designed to test an aspect or feature of the developed software package. The harness receives the extracted test cases, which are organized by the connector into a hierarchy that comprises one or more sets of test cases, known as "test suites," and one or more sets of test suites, known as "test modules."

The harness and connector utilize architecture that defines a means for accessing objects, functions, or other resources over a network, such as, by way of example, component object model ("COM") technology, Corba technology ("Corba"), and the like. Therefore, a programmer can employ any language or format for developing the program module so long as a means for accessing resources over a network is defined.

To illustrate the concept of a connector, the harness may include a component that can be called up and executed to extract test case information from the program module to create the hierarchy. The connector component scans the program module and creates the hierarchy by causing the program module to become a test module, a class within the program module to become a test suite, and a method within a class to become a test case. Properties within a class are ignored for purposes of creating the hierarchy.

The harness traverses the hierarchy to run selected test cases to identify erroneous logic in the software package. Each traversal of the hierarchy is referred to as a "test pass." A user enables or disables elements of the created hierarchy to test specific aspects or features of the developed software package. The elements are identified as being enabled, or alternatively disabled, by the use of a flag or similar indicator. The harness traverses the hierarchy, locates the selected test cases, and executes the selected test cases.

The harness also allows a user to specify parameters for each test pass. By way of example, a user can define the number of times to repeat each test case, test suite, and/or test module, the number of threads to run on, and so forth. Moreover, the harness has the ability to execute test cases on multiple threads in various situations.

The harness identifies the state of a test case in the hierarchy. By way of example, the state of a test case may be identified as "not run," "in progress," "passed," or "failed." The state of a test case may be reported through events that are sent asynchronously to the user. The user may instantly receive information about changes to the test cases of the hierarchy through the use of a client interface.

The harness is passive. It defines one or more interfaces that allow users to drive its functions. The interfaces define functions, which may be called by the users, that drive the harness. The functions are not performed unless the users utilize the interfaces to create a client application. The results and controls are displayed in any manner desired by the users.

Therefore, in accordance with the present invention, and without regard to the language or format employed, a hierarchy is organized and traversed to run selected test cases on developed software packages to identify erroneous logic and test cases are executed on multiple threads in various scenarios. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both systems and methods for gathering, organizing and executing test cases irrespective of the language or format employed. More specifically, the present invention relates to systems and methods that organize a hierarchy comprising test cases, test suites and test modules, traverse the hierarchy to run selected test cases on developed software packages to identify erroneous logic, and execute test cases on multiple threads in various scenarios. The embodiments of the present invention may comprise a special purpose or general purpose computer including various computer hardware, as discussed in greater detail below.

Throughout the following disclosure, reference is made to the execution of test cases on developed software packages through the use of a harness. In the disclosure and in the claims the term "test case" refers to a series of related steps designed to test an aspect or feature of the developed software package. Similarly, the term "harness" refers to a set of instructions for executing one or more test cases on the developed software package.

The disclosure also references a testing hierarchy that includes test cases, test suites, and test modules. In the disclosure and in the claims a "test suite" refers to a set of one or more test cases and a "test module" refers to a set of one or more test suites. Moreover, a "test pass" refers to the execution of one or more test cases, test suites, and/or test modules.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
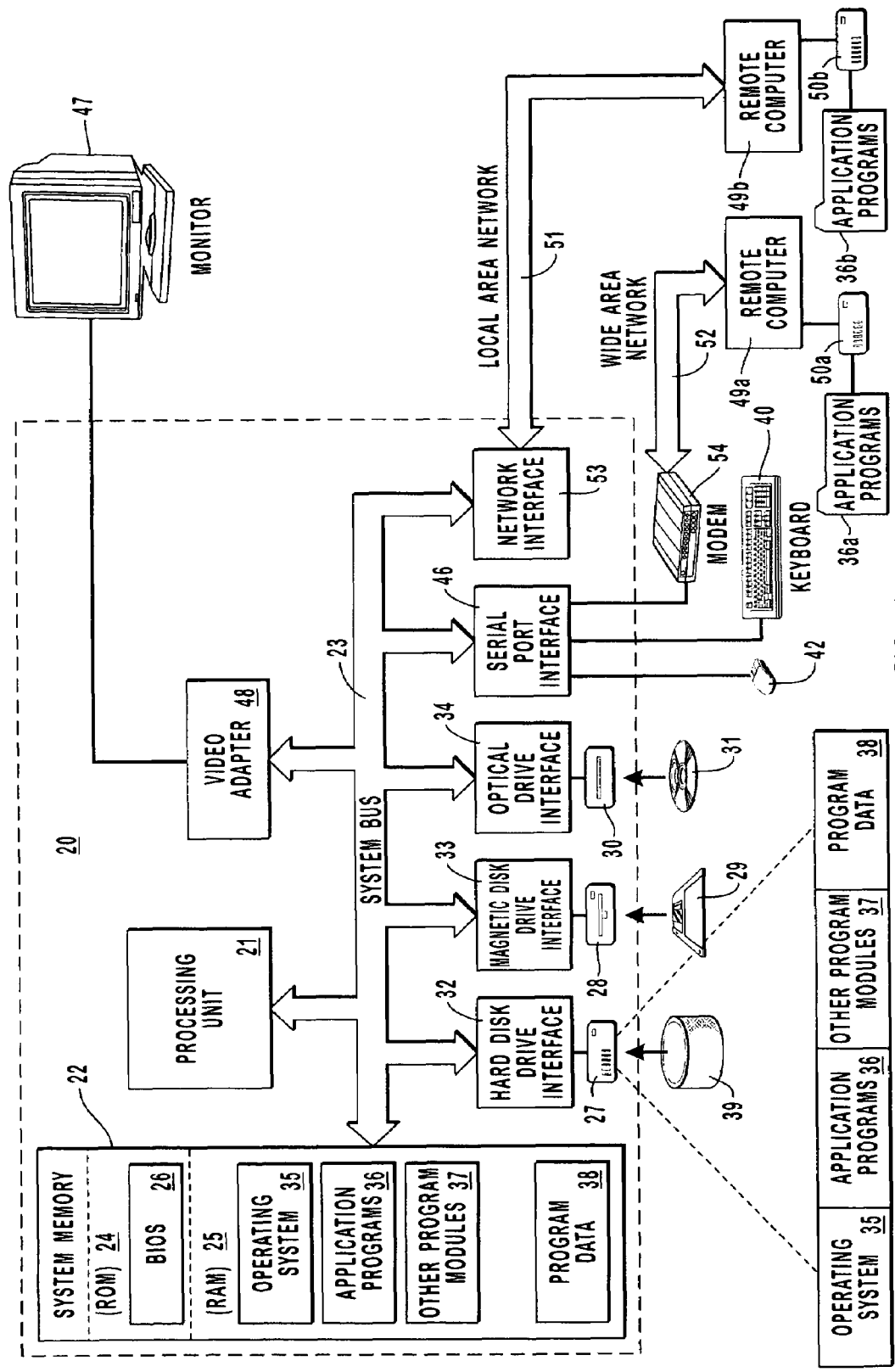
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The system illustrated in FIG. 1 provides an exemplary operating environment for identifying erroneous logic in accordance with the present invention. An exemplary structure for the present invention is created by interposing a harness between a software package, such as one of the application programs 36, and a program module, such as one of the program modules 37. Erroneous logic present in the software package is identified by executing the harness, which utilizes a connector to extract one or more test cases from the program module, receives an organized hierarchy from the connector that comprises test cases, test suites and test modules, and traverses the hierarchy to run selected test cases to identify erroneous logic in the software package, as will be detailed below.

Figure 2:
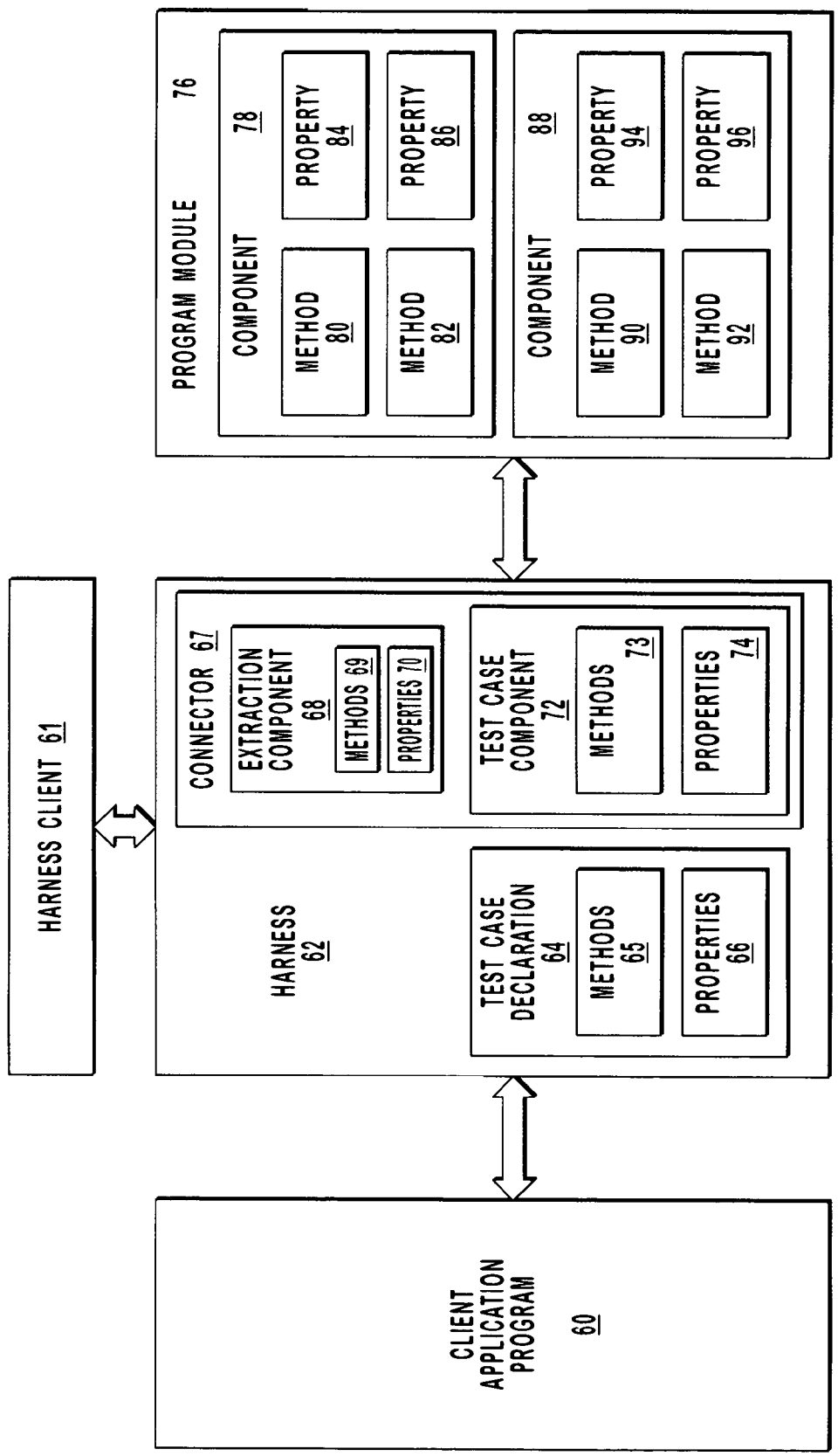
FIG. 2 is a block diagram that illustrates an exemplary configuration for practicing the present invention, where a harness is interposed between a software application and a program module for interpreting the program module and organizing a testing hierarchy.

Referring to FIG. 2, a harness 62 is interposed between a software package, illustrated as client application program 60, and a program module 76 for explanation purposes only. The harness exposes data structures, properties, and methods as will be further described below.

A client application, illustrated in FIG. 2 as harness client 61, is developed by the user to drive the harness. Harness client 61 uses a connector to extract one or more test cases from the program module 76, irrespective of the language or format employed. The harness receives the extracted test cases as an organized hierarchy, which may include one or more test suites and test modules.

Client application program 60 is a developed software package that is ready to be tested for erroneous logic. The testing occurs upon utilizing harness 62 through harness client 61. Harness 62 utilizes architecture that defines a means for accessing one or more resources over a network. In the disclosure and in the claims the use of the term "resource" also encompasses an object, a function, or the like. COM technology, Corba, and the like are examples of such means for accessing one or more resources over a network, as will be discussed below.

Program module 76 is connected to harness 62 through connector 67 and is written to test specific aspects or features of client application program 60. Similar to harness 62, connector 67 utilizes architecture that defines a means for accessing resources over a network, such as, by way of example, COM technology. As such, a programmer can employ any language or format for developing program module 76 so long as a means for accessing resources over a network is defined in connector 67.

Program module 76 is, by way of example, an executable software module that performs some function and is called by a running application to provide additional functionality. In the embodiment illustrated in FIG. 2, program module 76 is an ActiveX dynamic link library ("DLL"), which includes one or more user-defined data types that define a collection of objects having similar characteristics. The data types can be referred to as "classes" and are illustrated as components 78 and 88. While classes are generally defined as declarations of data structures in the software module code, running instances of a class in volatile computer memory are called objects, which contain data and provide methods and properties for accessing and operating on the data. By way of example, component 78 includes method 80, method 82, property 84 and property 86. Similarly, component 88 includes method 90, method 92, property 94 and property 96.

Harness 62 and program module 76 are connected through the use of a connector, illustrated as connector 67. In one embodiment, a user is able to write an individual interface for connecting a program module to the harness. In another embodiment, the connecting interface is predefined within the harness.

In the embodiment illustrated in FIG. 2, connector 67 is predefined within harness 62 and uses COM technology to expose two classes, illustrated as extraction component 68 and test case component 72. Test case component 72 implements methods 65 and properties 66 of test case declaration 64 as methods 73 and properties 74. Because test case component 72 implements test case declaration 64, the harness can execute the properties and methods on test case component 72, and object instances of the component can be inserted into the test hierarchy. Test case component 72 may also employ additional interfaces, properties and methods to communicate with program module 76. By way of example, a property (not shown) within test case component 72 is set to the program identification of a component of program module 76 that implements a test case as a method.

Extraction component 68 can be called up and executed to extract test cases from program module 76. In an embodiment of the present invention, extraction component 68 is a COM class that is used to extract test case information from program module 76 to create a hierarchy. Extraction component 68 scans program module 76 and creates the hierarchy whereby a program module becomes a test module, a class becomes a test suite, and a method becomes a test case. Properties within a class are ignored for purposes of creating the hierarchy.

Figure 3:
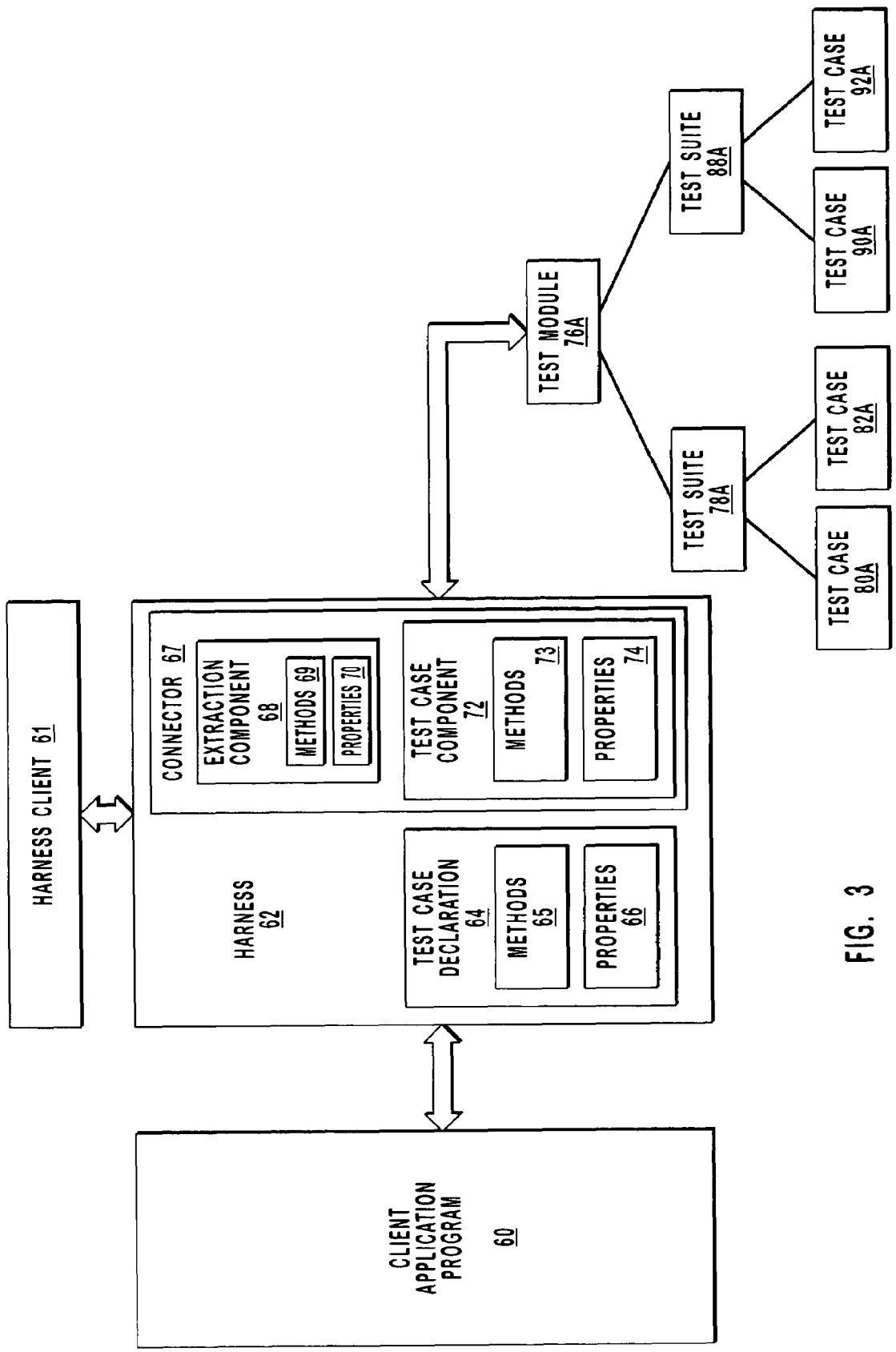
FIG. 3 is a block diagram that illustrates an exemplary configuration for practicing the present invention, where the harness of FIG. 2 traverses the testing hierarchy to run selected test cases on the software application.

FIG. 3 provides an example of extraction component 68 scanning program module 76 of FIG. 2 and creating a hierarchy that includes test cases, test suites, and test modules. In the hierarchy illustrated in FIG. 3, test module 76A corresponds to program module 76 of FIG. 2 and comprises test suites 78A and 88A. Test suite 78A corresponds to component 78 of FIG. 2 and includes test cases 80A and 82A, which respectively correspond to methods 80 and 82 of FIG. 2. Similarly, test suite 88A corresponds to component 88 of FIG. 2 and comprises test cases 90A and 92A, which respectively correspond to methods 90 and 92 of FIG. 2. As such, each method becomes an individual test case that is used to test a particular aspect or feature of client application program 60.

Returning to FIG. 2, harness client 61 performs the functions of extracting test case information from program module 76 and creating a hierarchy by employing one or more methods 69 and/or properties 70. One of the properties 70 is a search property that sets a safe array filled with the names of binaries (i.e. activeX DLLs and executables) that make up the hierarchy. In accordance with the present embodiment, a user is required to provide filenames for the search property.

A second property 70 is a test module property that points to a test module object that extraction component 68 created from the binaries that the user specified for the search property. The test module property is passed to harness 62 and a copy is made for executing a test pass, as will be further explained below.

Methods 69 include a scan method that looks through a registry to find each binary that the user specified for the search property. If, by way of example, a binary contains one or more COM components in the registry, the scan method co-creates a new test module object and adds the new test module object to a collection of test modules for each binary that the scan method finds in the registry. The name of the binary found by the scan method is used to populate the test module's name property. The scan method also co-creates a new test suite object for each class found in test module 76. Each new test suite object is added to the test module for the parent binary.

In FIG. 3, harness client 61 employs connector 67 to create the hierarchy. Harness client 61 then passes the hierarchy to harness 62, which receives the hierarchy, traverses the hierarchy, and executes test cases. Each traversal of the hierarchy is referred to as a "test pass." Harness 62 includes various properties and methods (not shown) to perform these functions. By way of example: A distribute property distributes test cases on available threads in a thread pool; A running property indicates whether harness 62 is traversing the hierarchy or is idle; A repeat enabled property toggles repeat functionality by selectively examining a repeat iteration property, which identifies the number of times to perform a function, and a repeat scope property, which identifies the scope at which to repeat; A start method is called by harness client 61 to inform harness 62 to begin a test pass; A stop method is called by harness client 61 to abort execution of a test pass; A test module property retains a copy of the hierarchy passed to the start method by extraction component 68; A thread count property allows a user to set the number of threads to be used in the thread pool to perform a test pass; And a timeout property allows a user to set a value in minutes, upon which a monitoring thread will kill a thread that exceeds the timeout value.

Therefore, harness client 61 employs connector 67 and harness 62 to traverse the hierarchy and run selected test cases for identifying erroneous logic in the software package. A user enables or disables elements of the created hierarchy to test specified aspects or features of the developed software package. The elements are identified as being enabled, or alternatively disabled, by the use of a flag or similar indicator. Harness 62 traverses the hierarchy in order to locate and execute the one or more selected test cases, test suites, and/or test modules.

By way of example, and with reference to FIG. 3, a user may desire to have test cases 80A, 82A, and 90A executed on client application program 60. As such, a user can disable test case 92A so that during a test pass all test cases are executed by harness 62 on client application program 60 except for test case 92A. This causes harness 62 to execute 12 test cases 80A, 82A, and 90A on client application program 60.

Alternatively, the user can enable test suite 78A and test case 90. Since a test suite is a set of one or more test cases, enabling test suite 78A is identical to enabling all of the test cases within the set defined by test suite 78A, namely test cases 80A and 82A, unless test cases 80A and 82A have been explicitly disabled by the user. Therefore, during the test pass the harness executes test cases 80A, 82A, and 90A on client application program 60.

Similarly, if a user desires to have test cases 80A, 82A, 90A and 92A executed on client application program 60, the user can enable test module 76A. Assuming the user has not explicitly disabled test cases 80A, 82A, 90A or 92A, and because a test module is a set of one or more test suites and each test suite is a set of one or more test cases, enabling a test module would be the same as enabling each of the underlying test cases individually. Therefore, enabling test module 76A enables test suites 78A and 88A, which in turn enables test cases 80A, 82A, 90A and 92A. As such, during a test pass harness 62 executes test cases 80A, 82A, 90A and 92A on client application program 60.

Harness 62 also allows a user to specify parameters for each test pass. By way of example, a user can define the number of times to repeat each test case, test suite, and/or test module, the number of threads to run on, and so forth. Moreover, the harness has the ability to execute test cases on multiple threads in various situations.

Figure 4A:
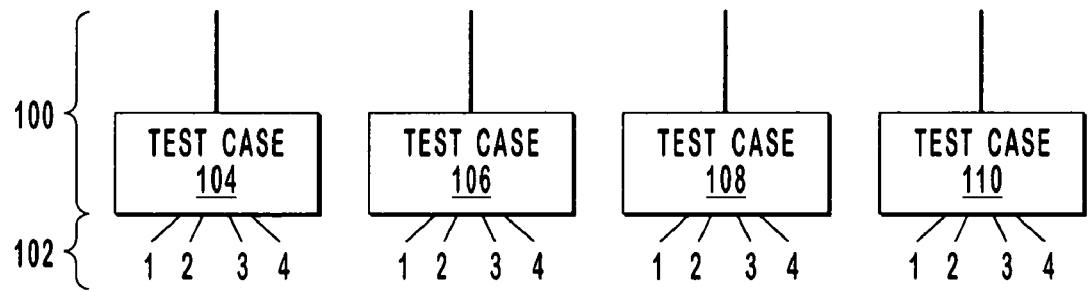
FIG. 4A illustrates multiple streams of test case execution that are applied in a parallel processing fashion to a software application.
Figure 4B:
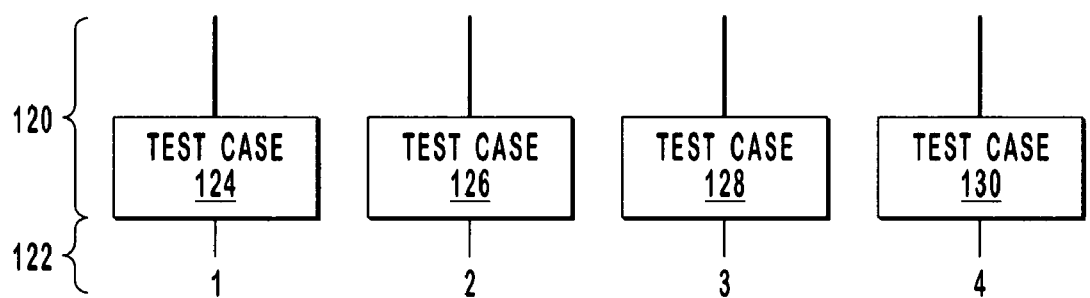
FIG. 4B illustrates multiple streams of test case execution that are applied in a round robin processing fashion to a software application.

FIGS. 4A and 4B provide, by way of example, the ability of the harness to execute test cases on multiple threads of a thread pool. A property of the harness 67 of FIG. 3 can be set to distribute test cases among one or more threads of a thread pool in order to execute the test cases on client application program 60. By way of example, when the distribute property is set to false each test case is executed across all threads of the thread pool and is run by all of the threads at the same time. Alternatively, when the distribute property of harness 62 is set to true, the next available test case in the hierarchy is pipelined through the thread pool to maximize throughput.

Referring first to FIG. 4A, an example is provided on cloning test cases, which occurs, by way of example, when the distribute property is set to false. In the embodiment illustrated in FIG. 4A, test cases 100 are the test cases obtained from a test pass that are to be executed on a software package and include test cases 104, 106, 108, and 110. In the illustrated embodiment four threads are in the thread pool. Threads 102 indicate the threads upon which each of the test cases 100 will begin running. In the illustrated embodiment, one of the test cases 100 is taken at a time, is copied across all threads in the thread pool and is executed across all of the threads. Therefore, by way of example, if test cases 104, 106, 108, and 110 are selected for execution on the software package and the thread count was four, then test case 104 is copied across all four threads and then is executed across all four threads. Next, test case 106 is copied across all four threads and then is executed across all four threads. Test case 108 is then copied across all four threads and is executed across all four threads. This process is continued until all of the selected test cases have been executed on the software package.

Alternatively, FIG. 4B provides an example of applying the selected test cases in a round-robin fashion on the threads, which occurs, by way of example, when the distribute property of harness 62 of FIG. 3 is set to true. In FIG. 4B, test cases 120 are the test cases obtained from a test pass that are to be executed on a software package and include test cases 124, 126, 128, and 130. In the illustrated embodiment four threads are in the thread pool. Threads 122 indicate the thread number upon which each of the test cases 100 will begin to run. In the illustrated embodiment, each of the threads is taken individually and is used to run a different test case. Therefore, by way of example, if test cases 124, 126, 128, and 130 are selected for execution on the software package and the thread count was four, then test case 124 runs on thread 1, test case 126 runs on thread 2, test case 128 runs on thread 3, and test case 130 runs on thread 4.

Therefore, in accordance with the present invention, test cases are extracted from a program module, a hierarchy is organized that comprises test cases, test suites and test modules, the hierarchy is traversed by a generic harness which is driven by a harness client to run selected test cases on developed software packages to identify erroneous logic, test cases are executed on multiple threads in various scenarios, and the results of the execution are immediately reported back to the user. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. A computer system for selecting and organizing individual test cases for use in testing a computer program to ensure that the program processes as intended, the system comprising:

one or more program modules storing a plurality of available test cases, each comprising a set of instructions for testing a feature of the computer program;

a harness client comprising a set of instructions that (i) receives user input specifying one or more filenames corresponding to the one or more program modules, (ii) initiates execution of a connector to scan for and discover the plurality of available test cases that are stored in the one or more program modules and to organize the plurality of available test cases into a test case hierarchy, and (iii) receives user input indicating which of the plurality of available test cases in the test case hierarchy are selected test cases to be executed on the computer program;

a harness comprising a set of instructions that (i) receives the test case hierarchy including the one or more program modules storing the plurality of test cases, (ii) traverses the test case hierarchy, and (iii) executes each of the selected test cases through a language and format independent interface by implementing an architecture that defines a means for accessing one or more resources over a network;

the connector, initiatable by the harness client, and comprising a set of instructions that (i) scans for the plurality of available test cases stored in the one or more program modules, (ii) organizes the plurality of available test cases into the test case hierarchy by extracting the plurality of available test cases from the one or more program modules, and (iii) selectively integrates the language and format independent interface in the test case hierarchy such that the harness can access the one or more available test cases using the architecture regardless of the language or format in which the one or more available test cases were written; and a processor for executing each selected test case, the harness, the harness client, and the connector, such that a first test case written in a first language and a second test case written in a second, different language are each executable by the processor through the language and format independent interface.

2. A computer system as recited in claim 1, wherein the architecture is COM technology.

3. In a computer system that includes a processor, a computer program to be tested, a program module storing a plurality of test cases of interest for use in testing the computer program, a harness for executing on the computer program individual selected test cases of the plurality of test cases of interest, a harness client for receiving user input, and a connector for interfacing between the a plurality of test cases of interest and the harness, a method for testing the computer program to determine whether the computer program processes as intended, the method comprising the acts of:

the harness client (i) receiving user input that specifies one or more filenames to identify the program module, (ii) initiates execution of the connector to scan for and discover the plurality of test cases of interest that are stored in the program module and to organize the plurality of test cases of interest into a test case, and (iii) receives user input indicating that at least two of the plurality of test cases of interest in the test case hierarchy are the selected test cases to be executed on the computer program;

the connector scanning the plurality of test cases of interest stored in the program module, wherein the connector is initiatable by the harness client, wherein the connector uses COM technology to expose an extraction component class that implements methods that are called by the harness client to cause the connector to scan for and organize the plurality of test cases into the test case hierarchy;

the connector extracting the plurality of test cases of interest from the program module using the extraction component class;

the connector using the extraction component class to organize the plurality of test cases of interest into the test case hierarchy, wherein the test case hierarchy comprises a plurality of objects including an object for the test module and an object for each of the test modules in the hierarchy;

the connector interfacing the harness with the test case hierarchy by exposing a test case component class that uses COM technology, wherein the harness calls methods of the test case component class to receive the test case hierarchy regardless of the language or format in which the plurality of test cases of interest was developed; and the harness traversing the test case hierarchy and executing each of the selected test cases to test the computer program, such that a first test case written in a first language and a second test case written in a second, different language are each executable by the harness because of the language and format independent interface.

4. A method as recited in claim 3, wherein the method further includes the step for determining whether one or more of the plurality of test cases of interest are identified as being deselected, wherein the harness traversing the test case hierarchy and executing each of the selected test cases includes not executing a deselected test case on the computer program.

5. A method as recited in claim 4, wherein the user input received by the harness includes input from the user indicating selection of the first test suite, and in response to the user input, the harness indicating the at least two of the plurality of test cases that comprise the first test suite as selected cases, and excluding any other of the plurality of test cases from the selected test cases.

6. A method as recited in claim 5, wherein the user input received by the harness includes input from the user indicating selection of the test module upon the user selecting a test module, the plurality of test suites that comprise the test module, excluding any test cases determined to be deselected are selected.

7. A method as recited in claim 3, wherein the step for traversing further includes executing the plurality of test cases on a thread pool comprising one or more threads.

8. A method as recited in claim 7, wherein the step for traversing further includes copying a selected test case across all of the one or more threads, and wherein the selected test case is executed across all of the one or more threads.

9. A method as recited in claim 7, wherein the step for traversing further includes executing a selected test case on one of the threads.

10. A computer program product for implementing within a computer system a method for testing a computer program to determine whether the computer program processes as intended, the computer program product comprising:

computer readable medium for providing computer program code means utilized to implement the method, wherein the computer program code means is comprised of executable code for implementing the acts of:

receiving user input that specifies one or more filenames to identify one or more program modules storing plurality of test cases of interest, each comprising a set of instructions for testing a feature of the computer program;

initiating execution of a connector to scan for and discover the plurality of test cases of interest that are stored in the program module and to organize the plurality of test cases of interest into a test case hierarchy, wherein the connector is initiatable by a harness client by calling methods of an extraction component class that is implemented by the connector using COM technology;

receiving user input indicating that at least two of the plurality of test cases of interest in the test case hierarchy are the selected test cases to be executed on the computer program;

scanning for the plurality of test cases of interest that are stored in the one or more program modules;

extracting the plurality of test cases of interest from the program module;

organizing the plurality of test cases of interest into the test case hierarchy;

interfacing with the selected test cases by calling methods of a test case component class that is implement by the connector using COM technology such that the test case class exposes a language and format independent interface in the test case hierarchy that allows a harness to receive the selected test cases regardless of the language or format in which the plurality of test cases of interest was developed;

traversing the test case hierarchy; and executing the plurality of test cases of interest on the computer program, such that a first test case written in a first language and a second test case written in a second, different language are each received by a harness through the same language and format independent interface.

11. A computer program product as recited in claim 10, wherein the step for traversing is performed by the harness.

12. A computer program product as recited in claim 10, wherein the step for interfacing is performed by one or more connectors.

13. A computer program product as recited in claim 10, wherein the plurality of test cases executed on the computer program are selected by a user through a user interface provided by the harness client.

14. A computer program product as recited in claim 13, wherein the step for traversing further includes executing the selected test cases on a thread pool comprising one or more threads.

15. A computer program product as recited in claim 14, wherein the step for traversing further includes copying a selected test case across all of the one or more threads, and wherein the selected test case is executed across all of the one or more threads.

16. A computer program product as recited in claim 14, wherein the step for traversing further includes executing a selected test case on one of the threads.

17. In a computer system that includes a computer program to be tested, a program module of a plurality of test cases written in any format or language for testing the computer program, a harness for executing a plurality of test cases on the computer program, a harness client for receiving user input, and one or more connectors for interfacing test cases with the harness, a method for testing the computer program to determine whether the computer program processes as intended, the method comprising steps for:

specifying one or more filenames for identifying one or more program modules storing a plurality of test cases, each comprising a set of instructions for testing a feature of the computer program;

identifying the plurality of test cases within the one or more program modules;

translating the identified plurality of test cases into a test case hierarchy that includes the plurality of available test cases, a first test suite, a second test suite, and a test module, the first test suite including at least two of the plurality of the available test cases, the second test suite including at least another one of the plurality of the available test cases, and the test module including the first and second test suites, the test module being executable by the harness;

indicating that the plurality of test cases in the test case hierarchy is to be executed on the computer program;

providing a language and format independent interface in the test case hierarchy, wherein the harness utilizes the language and format independent interface to receive the plurality of test cases regardless of the language or format in which the plurality of test cases was written, wherein the language and format independent interface includes a test case component class that is implemented by the connector using COM technology and includes methods that the harness calls to receive the test case hierarchy; and running each of the plurality of test cases in the test case hierarchy to test the computer program, wherein a first test case written in a first language and a second test case written in a second, different language are each received by the harness through the same language and format independent interface.

18. A method as recited in claim 17, wherein the act of executing is performed on a thread pool comprising one or more threads.

19. A method as recited in claim 18, wherein the act of executing is further performed by executing a selected test case on one of the threads.

20. A method as recited in claim 18, wherein the act of executing is further performed by copying the one or more selected test cases across all of the one or more threads, and wherein the selected test case is executed across all of the one or more threads.

* * * * *